United States Patent
Woodall

(10) Patent No.: US 8,358,379 B1
(45) Date of Patent: Jan. 22, 2013

(54) POST PROCESSING DISPLAYS WITH ON-SCREEN DISPLAYS

(75) Inventor: Neil D. Woodall, Newport Beach, CA (US)

(73) Assignee: Pixelworks, Inc., Tualatin, OR (US)

( * ) Notice: Subject to any disclaimer, the term of this patent is extended or adjusted under 35 U.S.C. 154(b) by 490 days.

(21) Appl. No.: 12/726,150

(22) Filed: Mar. 17, 2010

Related U.S. Application Data

(63) Continuation-in-part of application No. 12/533,703, filed on Jul. 31, 2009.

(51) Int. Cl.
*H04N 5/50* (2006.01)

(52) U.S. Cl. ........ 348/569; 348/563; 348/584; 348/586; 348/589; 348/590; 348/591; 348/592; 348/598; 348/599; 348/600

(58) Field of Classification Search .................. 348/563, 348/569, 584, 586, 589–592, 598–600
See application file for complete search history.

(56) References Cited

U.S. PATENT DOCUMENTS

| | | | |
|---|---|---|---|
| 6,195,087 B1* | 2/2001 | Wu ............................... | 345/213 |
| 6,628,324 B1* | 9/2003 | Onishi et al. .................. | 348/177 |
| RE39,214 E * | 8/2006 | Gryskiewicz ................. | 348/597 |
| 2002/0075410 A1* | 6/2002 | Tomikawa et al. ............ | 348/569 |
| 2002/0097338 A1* | 7/2002 | Voyer ............................ | 348/564 |
| 2002/0112248 A1* | 8/2002 | Takagi et al. ................. | 725/131 |
| 2004/0051705 A1* | 3/2004 | Lee ............................... | 345/204 |
| 2005/0270372 A1* | 12/2005 | Henninger, III ............. | 348/143 |
| 2006/0053444 A1* | 3/2006 | Rudolph et al. ............... | 725/38 |
| 2008/0122877 A1* | 5/2008 | Aoyama ....................... | 345/698 |
| 2009/0244379 A1* | 10/2009 | Tsai ............................... | 348/569 |

\* cited by examiner

*Primary Examiner* — Jefferey Harold
*Assistant Examiner* — Sam Huang
(74) *Attorney, Agent, or Firm* — Marger Johnson & McCollom, PC

(57) ABSTRACT

A method of processing on screen display data with an image post processor includes receiving a data stream from a video processor at a post processing device having at least one port, the data stream including on screen display data overlaid on a white background and the on screen display data overlaid on a black background, finding a difference between the on screen display data overlaid on white and the on screen display data overlaid on black, using the difference to determine a complement of an alpha blend value, performing image processing on the image data with the post processor by applying the complement of an alpha blend value to the image data to produce processed image data, and transmitting the processed image data and the on screen display data through a display port.

9 Claims, 4 Drawing Sheets

POST PROCESSING DISPLAYS WITH ON-SCREEN DISPLAYS

RELATED APPLICATIONS

This application is a continuation-in-part of, and claims priority to, U.S. patent application Ser. No. 12/553,703, filed Jul. 31, 2009.

BACKGROUND

On-screen displays (OSD) allow television and other display viewers to perform increasingly complex functions such as controlling settings for the television or display and menu selections for digital video recorders (DVRs) attached to the television. OSDs generally result from the video processor that operates the display. These video processors are typically highly integrated systems on a chip (SOC) and process input signals from a variety of sources for display by the television system, such as a flat panel or projector display.

The complexity of the SOCs makes them hard to program and software development times are becoming longer and more expensive. Manufacturers therefore tend to use the same SOC across all of their displays, leading to very little difference in image quality between the displays at the top and bottom of the product line.

The SOCs typically has only one output. This results in any post processing of the image after the SOC being applied to both the image and the OSD. When images are 'upscaled' or the frame rate is increased, this post processing actually degrades the appearance of the OSD. The one output also results in no post processing occurring if the OSD is to overlay the image. This may cause problems especially with 'transparent' OSDs, where the image can be seen 'through' the OSD.

DETAILED DESCRIPTION OF THE EMBODIMENTS

Video processors generally output the on screen display data as an overlay of the processed image data. Some display systems use post processors to perform more sophisticated image processing, generally for higher end systems, allowing the manufacturer to use the same video processor across all product lines but to provide extra processing for the higher end systems. The portions of the image data that lie under the on screen display generally cannot be processed as it causes artifacts in the on screen display.

One current solution uses a window to turn off the post processing in a region of the display, avoiding any degradation in the on screen display. Another approach uses a separate OSD input, which requires a re-programming of the video processor. It is generally desirable to avoid changing the OSD display design that results in the OSD data being included with the image data without any changes, while at the same time allowing more sophisticated processing algorithms to be applied to the image data for the entire image.

On screen displays have many uses, including control of the display system. A display system may consist of many different types of display systems, from flat panel televisions to computer monitors or any other device that displays video in a pixilated form. The term 'display' here will include any of these devices when used to refer to an output device that displays the video for a user to view.

The display system may have a system, or video, processor to process input signals from a variety of sources including a television signal tuner, a DVD or Blu-ray® disc player, a VCR, a computer, a set top box, a cable converter, or even a flash memory device. This system processor will typically consist of a system-on-a-chip (SOC) having the tuner, various converters, amplifiers, memory and processing elements in a single integrated circuit.

Figure 1:
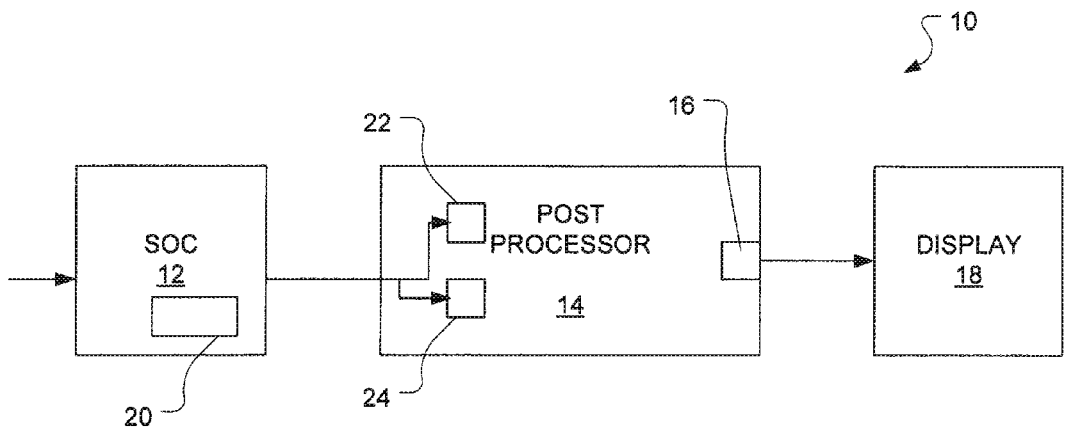
FIG. 1 shows an embodiment of a display system architecture.

FIG. 1 shows an architecture of a display system 10 having a SOC 12, a post or image processor 14 having a display port 16, and a display device 18. The SOC 12 receives a video input from one of a variety of sources. It then performs processing on the incoming video stream and includes OSD data as part of its output to the post processor 14, the process of which may involve the frame buffer controller 20. The post processor receives the data through one or more ports, shown here as ports 22 and 24. The post processor will process the image data for the entire image separate from the OSD, combine the data back together and then send it to the display 18 through the display port 16. The SOC may be referred to as a video processor, and the post processor may be referred to as an image processor.

Figure 2:
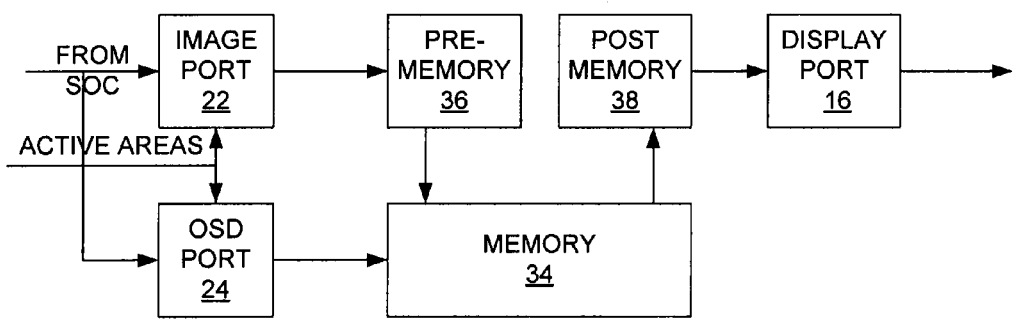
FIG. 2 shows an embodiment of an image post-processor.

FIG. 2 shows a more detailed view of an embodiment of a post processor such as 14 from FIG. 1. The post processor as shown here has two input ports, one port 22 for the image data and one port 24 for the on screen display data. In this instance, each input port will be programmed to capture a different area of the incoming data from the SOC. These ports may share the same connector, such as a package pin, and both may receive the same data stream including both the image data and the on screen display data.

Alternatively, the input to the post processor could be one port that switches between receiving the image data and the on screen display data or one port that captures both but stores them separately. The SOC may transmit the image data and the on screen display data in alternating frames, each frame consisting of fields of data interlaced to form a frame. For example, 1080i (1080 interlaced) signals have two fields of data, each 1920×540, to be combined together to form a 1920×1080 frame. A typical SOC would 'de-interlace' these fields to format them appropriately for a flat panel, pixilated display.

A simple change to the SOC software would bypass the final stages of de-interlacing and scaling and pass the raw fields onto the post processor. Doing so would result in the OSD data and the image data being transmitted to the post processor in alternating frames. In one embodiment, the port would switch between capturing the image data and the OSD data, storing each type separately.

In another embodiment, the port would capture both. When the image processor reads the data out of the memory, it reads only the image data. When the image processor overlays the OSD data, it would also read the portion of the memory that has the latest OSD data. This would be controlled by the frame buffer controller of the SOC, pointing to the appropriate data at the appropriate time.

The memory shown in the example of FIG. 2 is a frame memory 34. The post processor may store the OSD data and the image data in the same memory or in different memories, but for purposes of this discussion the same memory will be assumed. The memory may reside within the post processor or it may reside external to the post processor. The image data would then be processed at 36 and stored in memory then extracted from memory and further processed at 38. The processed image data and the OSD data are then recombined at the display port 16 and transmitted to the display.

In most cases, implementation of this post-processing device will involve bypassing the final deinterlacing and scaling portions of the video processor, a minor change to the operating software of the video processor. The SOC then transmits its output on one output.

The process of separating the OSD data from the image data will depend upon how the data is output from the SOC. One software change would result in the SOC sending out the OSD and the image data in alternating frames. Another would have the OSD data and the image data in the same frame, where the original image data would be smaller than the output frame. In this case, the SOC may need to communicate the location of the image data and the OSD data in the frame. However the OSD data and image data is output, they will be separated by the post processing device.

Figure 3:
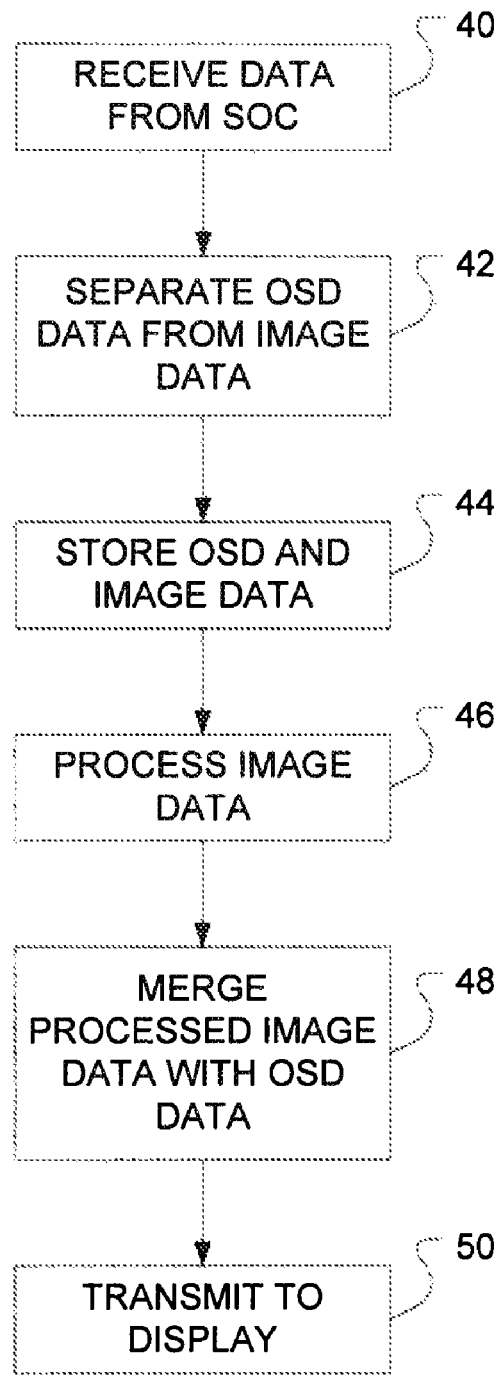
FIG. 3 shows a flowchart of an embodiment for processing and displaying on screen display data.

FIG. 3 shows an overview of an embodiment of a method to provide post processing of images in the presence of OSD data. The data stream containing the image data and the on screen display data is received as one data stream from the SOC at 40. The on screen display data and the image data are separated at 42, which may involve receiving a signal from the SOC as to the location of the two portions of data within the data stream. The OSD data and the image data are then stored separately at 44.

The image data undergoes processing at 46. One should note that the image data undergoing processing is the raw field/frame data of the entire image, not just those portions that do not lie under the OSD. This allows much more sophisticated algorithms that may use all of the image data to create clearer, sharper images.

If the raw field/frame data is passed to the post processor, the post processor will typically also perform frame conversion. Fields are received at a rate that is generally twice that of the frame rate. For NTSC, for example, fields are transmitted at 60 field per second, allowing a 30 frame per second rate. The raw incoming fields from the SOC would have to be converted to a frame rate to match the display.

In the case where the OSD data and the image data are in alternating frames, frame rate conversion may take the form of duplicating the image frame to achieve the proper frame rate (such as 30 fps). The frame rate to be achieved may depend upon the source frame rate, the 'original' frame rate. For 30 frames per second replication, each frame would be displayed twice. For 24 frames per second, each frame would be displayed twice, with every second frame displayed a third time, referred to as 3:2 pull down. With the post processor receiving the raw image data, it is the part of the system that performs this conversion, made a little more complicated by the alternating frames of OSD and image data.

An alternative approach from the replication of the image data to fill the frame rate above would be to interpolate the frames to fill the 'gaps' left by the alternating frames of OSD data. Frame interpolation is a process in which the data of two or more frames is used to arrive at an intermediate frame that would occur between them in time. If there is no motion between the two frames, the middle frame will be very much like either of the two 'outside' frames. If there is motion between the two frames, the frame data for the frame in between them would replicate that motion to be between the two positions shown in the outside frames. This would also be accomplished by the post processor.

In one embodiment, the OSD data may only be transmitted when it changes. In this case, the frames would only include an OSD frame when the change occurred. This results in the post processor only having to replicate frames when there is an OSD frame.

Once the image data is processed, it is merged back with the OSD data at 48. The separation of the OSD data from the image data may allow more sophisticated processing to be performed on the image data than would otherwise be possible with the presence of the OSD data in the image data. Examples of such processing include sharpness, peaking, color enhancement, and de-interlacing.

Another type of image processing performed in the separated image data would include scaling. Scaling of the image data may become simpler than if the OSD data is present. For example, an Internet video stream has a native resolution of 320 pixels by 240 pixels (320×240). A video processor can perform 'super-processing' on this video, scaling it up to 1920×1080, a process made simpler if only applied to the image data. However, it may be desirable to scale the OSD data by a different factor, such as a 2× scale. Separation of the OSD data from the image data allows this to happen.

Another image processing technique allowed by the separated image data lies in three-dimensional imaging. Generally, the SOC can correctly process the image data, it cannot correctly generate an OSD compatible with the three-dimensional format. Separating the image data from the OSD data at the post processor allows for three-dimensional image displays with OSD.

How the OSD appears on the display will depend largely upon how the SOC transmits the OSD data and the image data to the post processor to trigger the overlay. In one method would overlay the OSD on a background color. The background color would serve as a chroma key, as is used in blue and green screen processing, where any portion of the video that matches the chroma key is replaced with the overlay. If the full value of the chroma key is present, then the OSD would be transparent. If none of the value of the chroma key is present, then the OSD is opaque.

To simplify the processing, with a slight change to the SOC software, the SOC can transmit the OSD without the alpha channel value and one can avoid having to overlay the OSD on a chroma key background. The alpha blend channel has information, usually stored between 1 for opaque and 0 for transparent. It determines the amount of transparency for the OSD. The SOC outputs the OSD and image data using the formula $$\text{Output}=(1-A)*\text{image}+A*\text{OSD}$$

Figure 6:
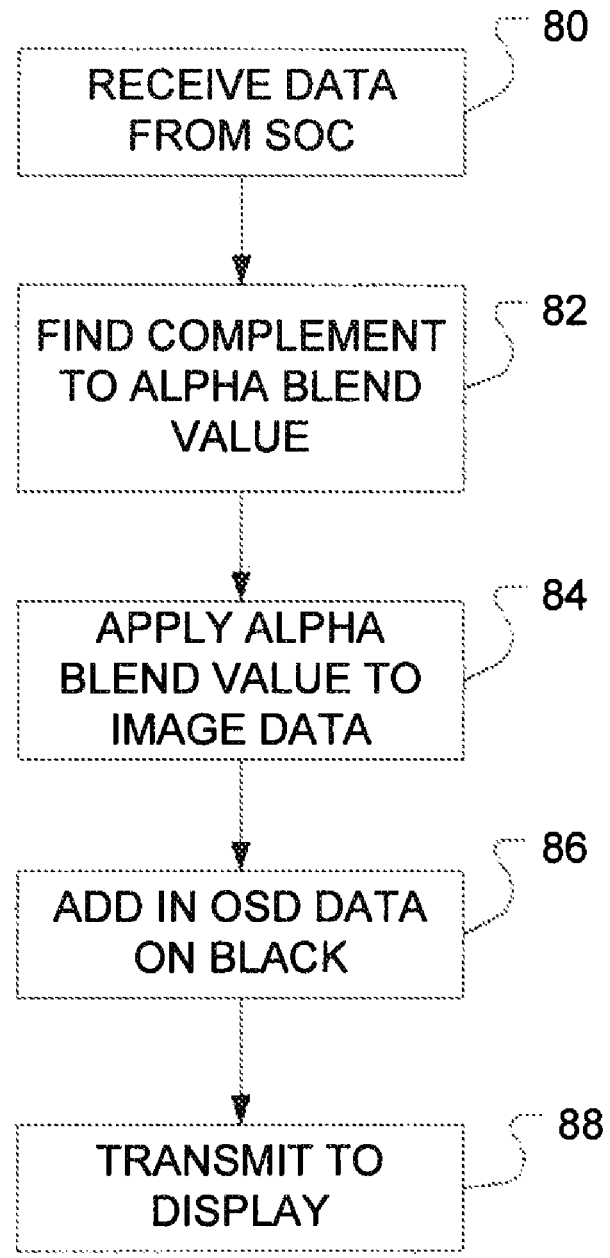
FIG. 6 shows a flowchart of an alternative embodiment of processing and displaying on screen display data.

The SOC can also typically transmit the OSD on a solid background. In this case, the OSD will transmit the OSD on two different backgrounds: on a white background (WOSD) to the post processor and then the OSD on a black background (BOSD) as shown in FIG. 6. This data is received and may be stored by the post processor at 80.

Generally, one typically needs to know the blending factor, alpha or A, to blend an OSD with the background. In this case, the OSD is already blended using the alpha value, so one needs to find values that simplify the processing. When the OSD is blended with the black background, the post processor is effectively receiving the OSD times the alpha value, one half of the equation above. To do the blend, one needs to find the complement of the blending factor (1-A) at 82 using the relationships:

$$\text{WOSD}=\text{Max value}*(1-A)+A*\text{OSD}; \text{ and}$$

$$\text{BOSD}=\text{Min value}*(1-A)+A*\text{OSD}.$$

The Max value is either 255 or 1023, depending upon the color resolution, and the Min value is Black, which is 0. Therefore:

$$WOSD-BOSD=(\text{Max value}*(1-A)+A*OSD)-(A*OSD), \text{ or Max value}*(1-A).$$

From this, one can determine the complement of the alpha blend value, (1−A), by dividing the result by 256 or 1024 depending on the color resolution.

One can then take the image data and multiply it by the complement of the alpha blend value at 84 and add in the Black OSD stored previously at 86 to generate the image plus OSD overlay data at 88 in a simpler fashion without requiring a chroma key.

In another method, the OSD would be transmitted as an index color. The input port from the SOC will generally capture 3 channel (red, green and blue) color data. This would allow several bits to be reserved for an alpha blend channel, discussed above. In one embodiment, the alpha blend channel would be transmitted with the OSD data in the alternating frame format mentioned above. In another embodiment, the OSD alpha blend channel would be transmitted on a different frame than the OSD.

In another method, the OSD could be considered to be opaque or to have a fixed, predetermined level of transparency. In this method, the SOC may communicate with the post processor to turn the OSD overlay process on or off. This would result in the OSD either being present, from the viewer's perspective, or in it not being there at all. If the viewer provides an input, such as a programming request or a control input from a remote, the OSD would be on, for example. This method can be combined with the chroma key method to allow complex OSD shapes to be blended with the video Referring back to the post processing device diagram of FIG. 4, when the OSD is turned ON, the frame buffer controller would point to an area of the memory that has not data, only black. When the OSD is OFF, the SOC frame controller would point to the actual data.

Figure 4:
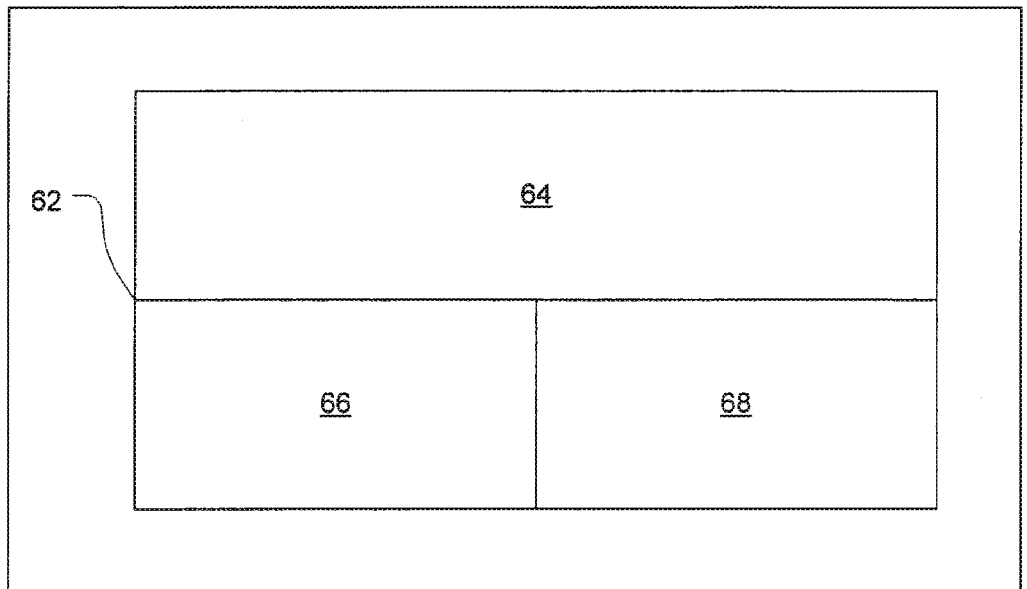
FIGS. 4 and 5 show embodiments of an on-screen display.

In addition to how the overlay is accomplished, it may also be possible to alter that format of the OSD using the techniques of this invention. FIG. 4 shows an example of a displayed image having an active area 62 of 1920×1080. The displayed area has an upper window 64 of 1920×540 for video images and two side-by-side OSD areas 66 and 68, each of 960×540. In some high resolution displays, the OSD is often stored as 960×540 and then upscaled to display, so this may allow them to be displayed in their 'native' format.

The above display assumes a 'standard' OSD window with 'standard' blanking intervals. The blanking intervals remain in many standards because of the need to accommodate cathode ray tube systems that need time to move the scanning guns back and forth and from the bottom of the screen back to the top. As flat panel, pixilated displays do not need this, the SOC software could be altered to provide for more lines for the OSD in conjunction with the overlay process, with the reservation that the processor clock rates should be maintained.

Figure 5:
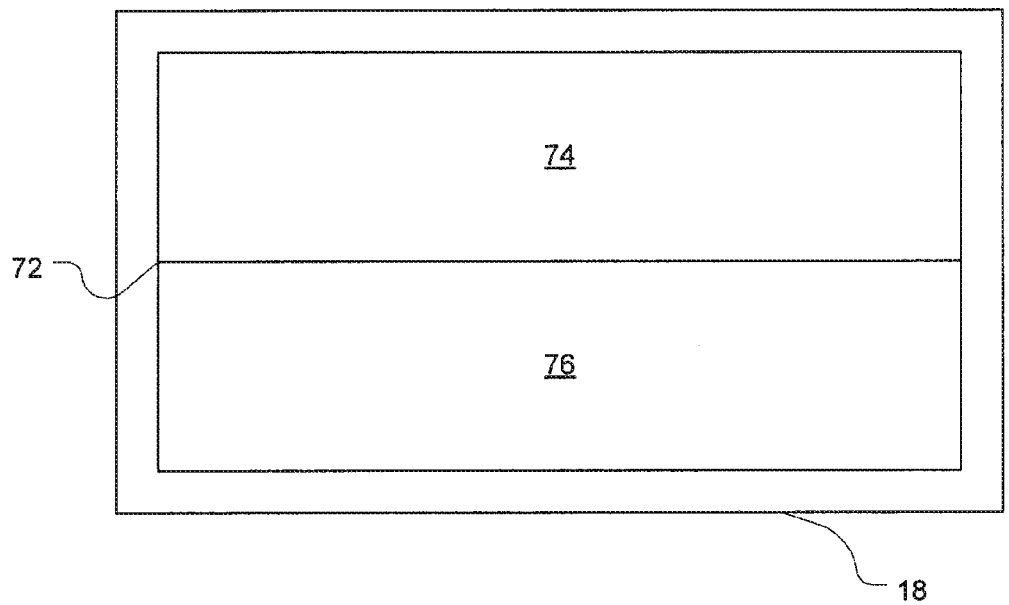

FIG. 5 shows an alternative OSD display 76 of 1920×744 lines instead of 540. This was accomplished by minimizing the horizontal and vertical blanking intervals to reduce the window 72 to 1924×1286, leaving the video display portion 74 on the upper part of the window at 1920×540. In the display of FIG. 4, the active area is 1920×1080 of a window of 2200×1125. The processor clock rate is 2200×1125×60 Hz, or 1.485 MHz. In the display of FIG. 5, the processor clock rate is 1924×1286×60 Hz, or 1.4845 MHz, allowing maintenance of the same processor clock rate.

Returning to FIG. 3, the merged data is then transmitted to the display device at 70. The merging and transmitting may both be accomplished at the same portion of the post processor, or may be performed by different portions. The transmission of the data to the post processor facilitates the ability to perform further processing on the image data, while allowing manipulation and alteration of the OSD data to effect various changes to the resulting OSD as displayed to the viewer.

Although there has been described to this point a particular embodiment for a method and apparatus for post processing of image data with OSD data, it is not intended that such specific references be considered as limitations upon the scope of this invention except in-so-far as set forth in the following claims.

What is claimed is:

1. A method of processing on screen display data with an image post processor, comprising:
   receiving a data stream from a video processor at a post processing device having at least one port, the data stream including on screen display data overlaid on a white background and the on screen display data overlaid on a black background;
   separating the image data from the on screen display data;
   finding a difference between the on screen display data overlaid on white and the on screen display data overlaid on black;
   using the difference to determine a complement of an alpha blend value;
   performing image processing on the image data with the post processor including applying the complement of an alpha blend value to the image data to produce processed image data; and
   transmitting the processed image data and the on screen display data through a display port.

2. The method of claim 1, wherein receiving a data stream comprises receiving the image data and the on screen display data as separate frames.

3. The method of claim 1, wherein performing image processing includes merging the on screen display data with the processing image data to be displayed as one of either side-by-side or the on screen display data as an overlay of the image data.

4. The method of claim 1, wherein performing image processing further includes adding back in the on screen display data overlaid on the black background to the data to which the alpha blend complement has been applied.

5. The method of claim 1, wherein performing image processing comprises performing at least one of sharpness, de-interlacing, color enhancement or peaking before applying the complement of the alpha blend to the image data.

6. The method of claim 1, wherein performing image processing comprises scaling the image data separate from the on screen display data from an original resolution to a higher resolution.

7. The method of claim 1, wherein scaling the image data comprises scaling the image data form the original resolution of 320 pixels by 240 pixels to a higher resolution of 1920 pixels by 1080 resolution.

8. The method of claim 6, wherein performing image processing includes scaling the on screen display data by a factor of 2.

9. The method of claim 1, wherein the image processing includes processing the image data for three-dimensional display.

\* \* \* \* \*